UNITED STATES PATENT OFFICE.

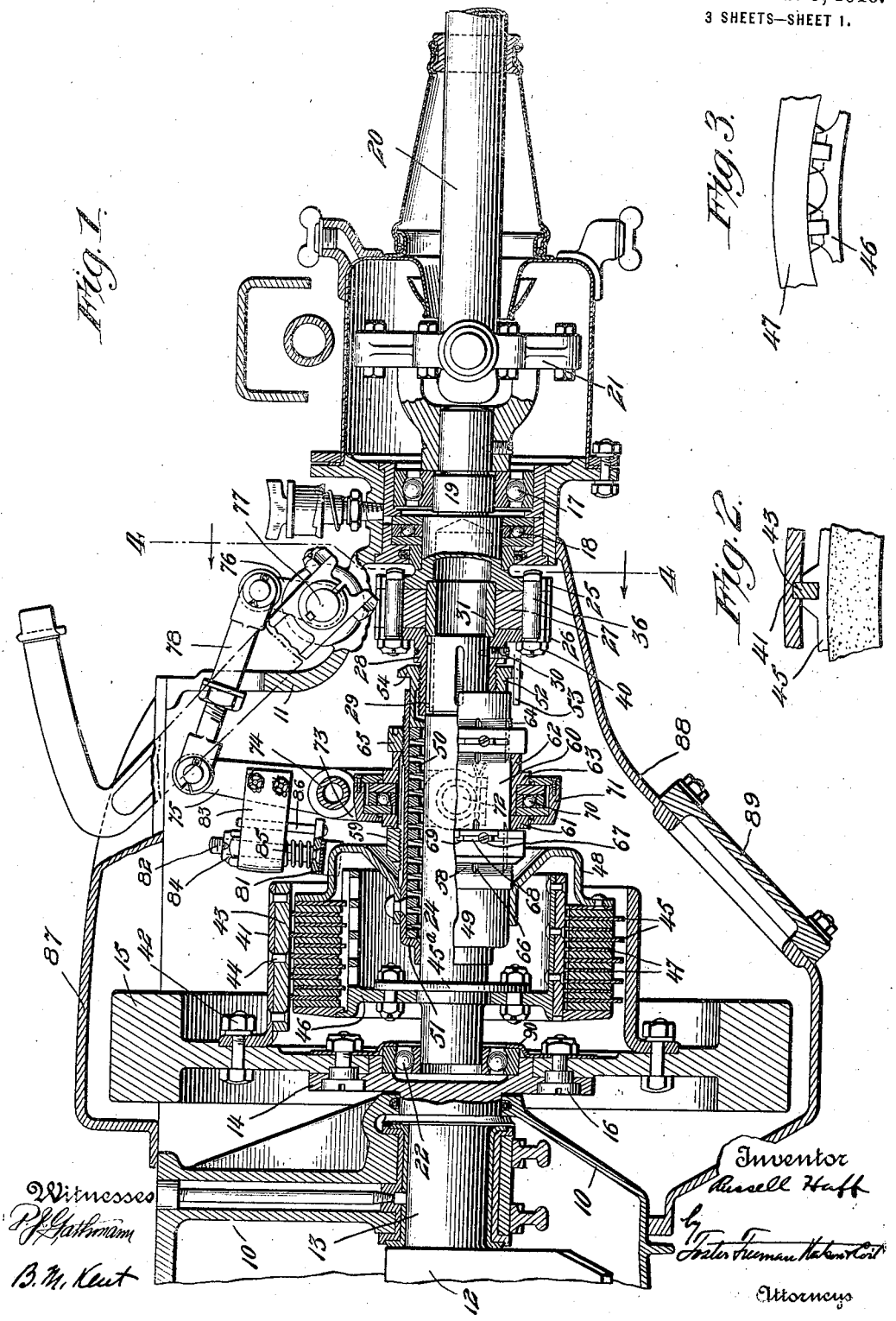

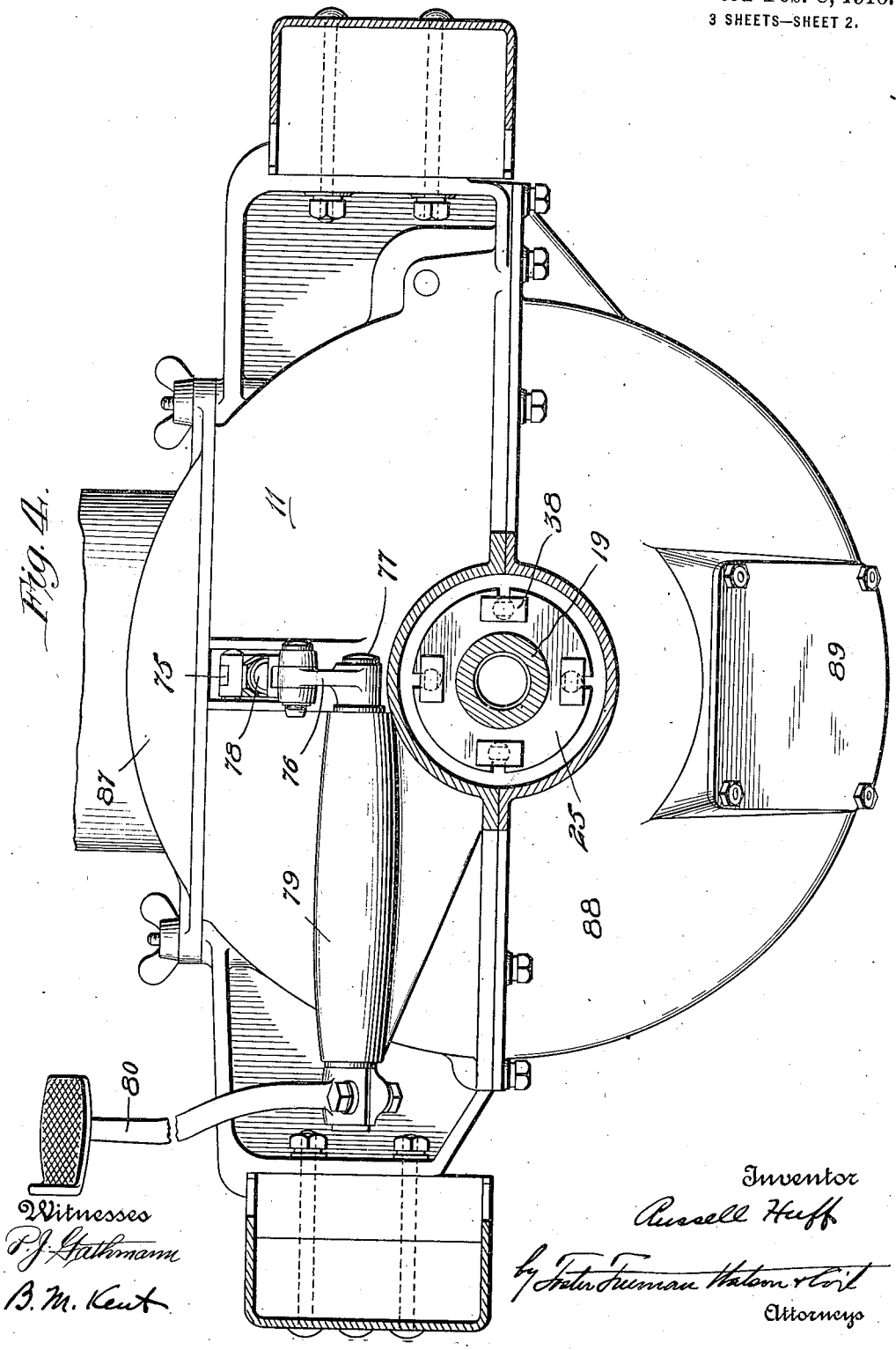

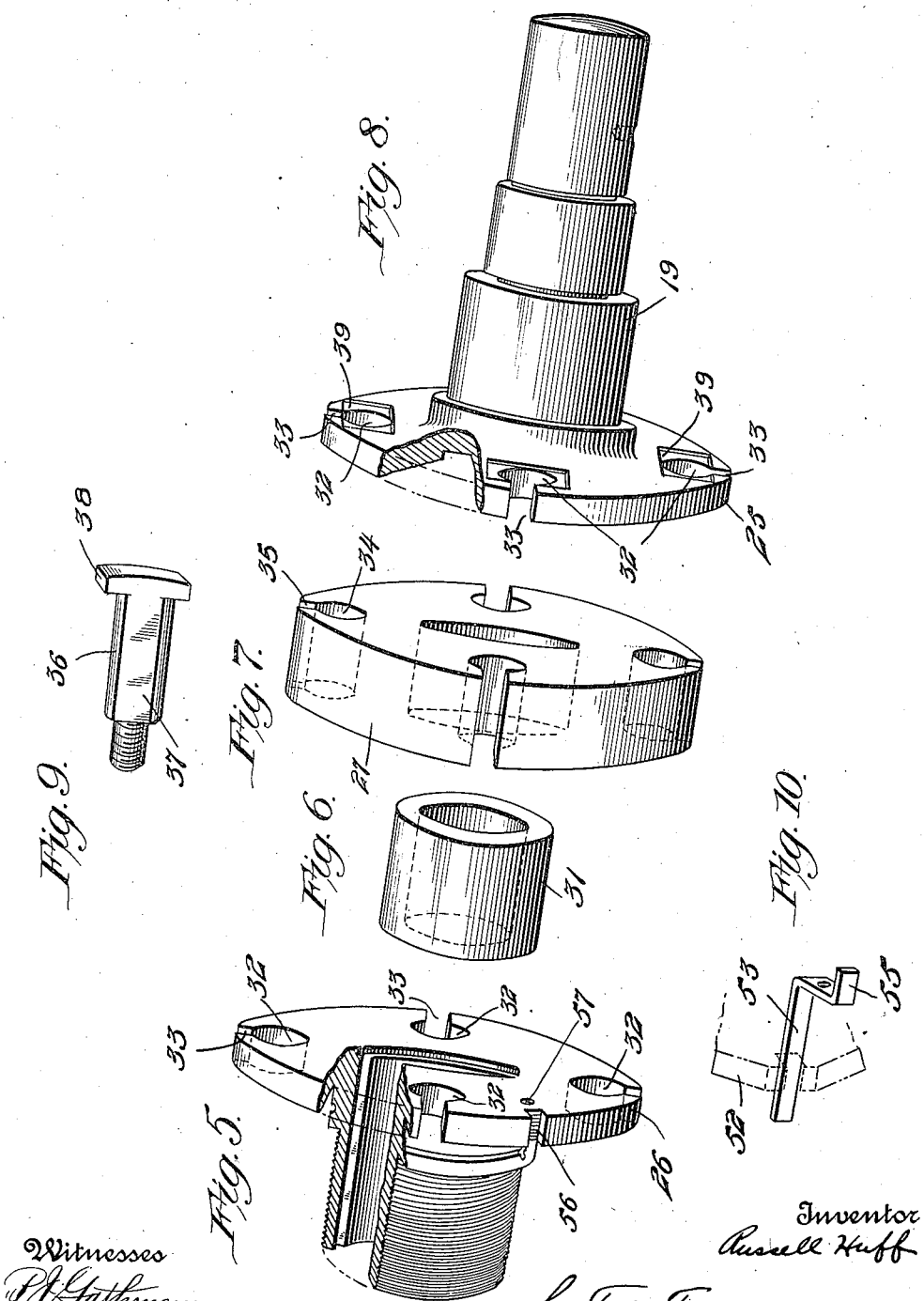

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

CLUTCH MECHANISM.

1,171,341.    Specification of Letters Patent.    Patented Feb. 8, 1916.

Application filed March 1, 1913. Serial No. 751,627.

*To all whom it may concern:*

Be it known that I, RUSSELL HUFF, a citizen of the United States, and resident of Detroit, in the county of Wayne and State of Michigan, have invented certain new and useful Improvements in Clutch Mechanisms, of which the following is a specification.

This invention relates to improvements in the clutch mechanism whereby power is transmitted from one shaft to another.

More specifically the invention relates to improvements in the construction shown in my prior Patent No. 1,122,119 issued December 22, 1914.

The objects of the present invention are to provide a clutch mechanism in which the clutch shaft, which is connected with the propeller shaft, is carried in bearings, the rear one of which is in an integral extension of the crank case and the forward one of which is in the crank shaft of the motor, whereby absolute alinement of the parts is obtainable.

It is desirable to have the clutch mechanism removable as a whole and therefore in order to provide a convenient construction for this purpose I have made the clutch shaft in three sections, the forward section carrying the clutch mechanism and the rear section being connected with the propeller shaft and carried in the bearing in the crank case extension, above referred to. I have also provided an intermediate section for connecting the end sections, this intermediate section being removable laterally to permit the forward section with the clutch mechanism thereon to be withdrawn from its bearing in the crank shaft.

In the construction shown in my prior application, above referred to, the forward end of the clutch shaft is carried by the fly-wheel and in order to simplify this construction and make the alinement of the parts more absolute I have arranged the bearing for the forward end of the clutch shaft in the crank shaft, as above mentioned, so that the bearing for the rear section of the clutch shaft can be machined with the bearings for the crank shaft, all of which bearings are in the crank case. It is a simple matter to accurately locate a bearing in the end of the crank shaft and therefore when the parts are assembled there will always be absolute alinement of all of the bearings.

A further object of this invention is to provide means for stopping the spinning of the clutch shaft and the parts carried thereby when the clutch is disengaged for the purpose of shifting the change speed gears of the vehicle.

Further objects are to provide improvements in the various details of construction, and the novel features of the invention will be apparent from the following description taken in connection with the accompanying drawings, in which:

Figure 1 is a longitudinal section through a clutch embodying my invention and showing the same in relation to the parts with which it coöperates; Figs. 2 and 3 are views of details; Fig. 4 is a section on the line 4—4 of Fig. 1; Figs. 5 to 9 are perspective views of details of the parts of the clutch shaft and show the manner of connecting the same; Fig. 10 is a perspective view of a locking device for one of the adjusting nuts.

Referring to the drawings, 10 indicates a portion of the upper half of the crank case of a motor, and 11 indicates a rearward extension of this section of the crank case. A portion of the crank shaft is indicated at 12, the end bearing of the crank shaft being shown at 13. The crank shaft, rearwardly of the bearing 13, is provided with a flange 14 to which a fly-wheel 15 is attached in any suitable manner as by means of the bolts 16. In alinement with the bearing 13, the extension 11 is provided with a radial bearing 17 and a thrust bearing 18 for the rear section 19 of the clutch shaft, this section being connected with the propeller shaft 20 by means of the universal joint coupling 21.

The rearward end of the crank shaft is recessed to receive a radial ball bearing 22 for the forward section, 24, of the clutch shaft, this shaft being removable axially from the bearing 22. The adjacent ends of the sections 19 and 24 of the clutch shaft are provided, respectively, with the flanges 25 and 26, between which is arranged a filler block 27. The flange 26 is preferably separable from the forward section 24 of the clutch shaft and has its hub 28 secured thereon in any suitable manner as by means of the key 29 and the set screw 30. For the purpose of alining the flanged ends of the sections 19 and 24 of the clutch shaft, these ends are provided with suitable recesses adapted to receive the sleeve 31, this sleeve telescoping with the shaft sections for a slight distance and being arranged in a central bore in the filler block 27. For the purpose of securing the flanges 25 and 26 together I have provided them with the alined bolt holes 32 and the slots 33 which extend from the peripheries of the flanges to the holes 32. The filler block 27 is provided with similar holes 34 and slots 35 so that, when the parts are in the assembled position shown in Fig. 1, bolts 36 having flattened sides 37 are adapted to be passed laterally through the slots 33 and 35 to a position in the holes 32 and 34. As shown in the drawings the slots 33 and 35 are less in width than the diameter of the holes 32 so that when the bolts 36 have been arranged in the holes they will be prevented from being removed laterally through the slots 33 and 35 by being turned substantially 90° from the position in which they were passed through the slots. In order to secure the bolts 36 in position so as to prevent their turning in the holes 32 and 34 I have provided the bolts with the rectangular heads 38 which are adapted to be arranged in the rectangular recesses 39 in the flange 25. When thus arranged the parts may be clamped up by means of nuts 40.

The fly-wheel 15 has secured thereon the outer member or casing 41 of the clutch and in the illustrations I have shown this casing as being secured to the fly-wheel by means of the bolts 42 although it will be understood that any other suitable securing means may be employed. On the interior of the casing 41 are arranged a plurality of keys 43 which are secured to the casing in any suitable manner as by means of rivets 44 and which constitute means for connecting a series of clutch disks 45 with the casing so that these clutch disks will rotate with the casing and the fly-wheel. The forward section 24 of the clutch shaft is provided with a flange 45ª on which is bolted a spider 46, this spider carrying disks 47 which coöperate with the disks 45 to form a driving connection between the casing 41 and the spider for the purpose of transmitting power from the crank shaft of the motor to the clutch shaft.

As will be readily understood from Fig. 1 the spider 46 is secured against axial movement on the clutch and for the purpose of clamping the disks 45 and 47 together in gripping engagement I have provided a plate 48 which bears against the rearmost of the clutch disks and is secured to a sleeve 49, which is slidable on the forward section 24 of the clutch shaft. It will be obvious that by forcing the plate 48 forwardly, so as to compress the clutch disks, a driving connection will be formed between the casing 41 and the spider 46, and since it is desirable to normally have a driving connection between these parts I have provided within the sleeve 49 a very stiff helical spring 50, this spring bearing at its forward end against the end 51 of the sleeve and at its rearward end against a sleeve or nut 52 which is threaded on the hub 28. The sleeve 52 telescopes within the sleeve 49 so as to form a bearing for the rear end of the latter. The tension of the spring 50 may be adjusted by rotating the sleeve 52 on the hub 28, and in order to securely hold the sleeve 52 in any adjusted position, I have provided a locking member having an arm 53 adapted to engage a suitable slot in the flange 54 of the sleeve 52, and also an arm 55 adapted to engage a slot 56 in the periphery of the flange 26. The locking member may be secured to the flange 26 in any suitable manner as by means of a screw engaging a suitable threaded opening 57 in the flange 26.

The sleeve 49 is provided with a threaded portion 58 adapted to receive a nut 59, and a cylindrical portion 60 adapted to receive a ring 61 and a collar or sleeve 62 having a flange 63. Rearwardly of the cylindrical portion 60, the sleeve 49 is provided with a threaded portion 64 of smaller diameter than the cylindrical portion 60 and adapted to receive a nut 65. The nuts 59 and 65 coöperate to secure the ring 61 and the sleeve 62 to the sleeve 49 and the position of these parts on the sleeve 52 can be adjusted axially by turning the nuts 59 and 65. These nuts may be secured in position in any suitable manner as by providing longitudinal slots 66 in the surface of the sleeve 49, these slots being engaged by suitable screws 67 which are held against turning by cotter pins 68 arranged in slots 69 in the surface of the nuts.

A thrust bearing 70 is arranged on the sleeve 62 between the ring 61 and the flange 63, and surrounding this thrust bearing is a shifting collar 71 provided with the usual trunnions 72 which are engaged by the arms 73 of a shifting yoke which is secured to a pivot 74. There is also secured to the pivot 74 and extending upwardly therefrom an actuating arm 75 which is connected with an arm 76 on the shaft 77 by means of a link 78 of adjustable length. The shaft 77 is arranged in a suitable bearing 79 and is actuated by a pedal lever 80. The lever 80 extends to a position where it may be conveniently engaged by the foot of the driver of the vehicle and the position of this lever may be varied to suit the driver's convenience, by means of the link 78, which, as above stated, is of adjustable length. Any suitable means may be employed for adjusting the length of the link 78 and as such devices are in common use a detailed description thereof is deemed to be unnecessary.

For the purpose of stopping the spinning of the clutch shaft and the parts carried thereby when disconnected from the crank shaft of the motor I have provided a brake shoe 81 which is carried on the end of a rod 82, this rod being arranged in a bracket 83 on the arm 75 so that the bracket moves with this arm. The upper end of the rod 82 is threaded, as shown, to receive a nut 84 and, between the shoe 81 and the bracket 83, I arrange a spring 85 for the purpose of pressing the shoe 81 downwardly, the tension of the spring and the position of the shoe relative to the bracket 83 being adjusted by means of the nut 84. As clearly shown in Fig. 1, the shoe 81 is adapted to contact with the surface of the plate 48 when the arm 85 is rocked forwardly for the purpose of releasing the clutch disks. In order to hold the brake shoe in proper relation to the plate 48 I have secured to the shoe an upwardly extending rod or pin 86 which is adapted to slide through a suitable opening in the bracket 83 and thereby prevent the rod 82 from rotating in the bracket 83.

The upper part of the extension 11 of the crank case is preferably provided with an opening and this opening is normally closed by a removable cover 87. The lower side of the extension 11 is likewise provided with a cover 88, this cover being substantially the full width of the extension 11, as shown in Fig. 4, for the purpose of permitting the clutch shaft, with the clutch parts assembled thereon, to be removed downwardly. The flywheel is also removable downwardly through the opening in the lower side of the extension 11. The cover 88 may be provided with a hand-hold plate 89 for the purpose of rendering the interior of the casing and the clutch parts accessible.

When it is desired to remove the clutch shaft and the clutch, the bolts 36 are removed laterally and the shaft section 24 is moved a slight distance forwardly in the bearing 22 to permit the disengagement and removal of the filler block 27 and the sleeve 31. When these parts have been removed and the casing 41 has been disconnected from the fly-wheel 15 the forward section 24 of the clutch shaft with the clutch mechanism thereon may be bodily moved rearwardly a sufficient distance to withdraw the forward end of the shaft section from the bearing 22. The whole mechanism may then be removed downwardly, it of course being assumed that the cover 88 has been previously taken off. In order to hold the bearing 22 in position I have provided a retaining plate 90 which is preferably secured by the bolts 16 which secure the fly-wheel to the flange 14 of the crank shaft.

From the foregoing it will be seen that it is possible to readily remove the forward section of the clutch shaft with the assembled clutch parts thereon without disturbing the bearings for the rear section 19 of the clutch shaft or the universal joint 21, thus greatly simplifying the work of removing the clutch, over what is required in the prior constructions, and at the same time providing a construction in which all of the bearings are in absolute alinement.

It will be obvious to those skilled in the art that various changes may be made in the details of construction, within the scope of the claims, and therefore I do not wish to be limited to the exact construction which I have illustrated.

Having thus described the invention, what is claimed is:

1. In a motor vehicle, the combination with the motor and its crank case, the crank case provided with an extension provided with a bearing having its crank shaft of the motor, and a sectional clutch shaft supported at one end in said bearing and at its other end in the crank shaft, said clutch shaft comprising end sections adapted to be removed from the supporting bearings axially and an intermediate section adapted to be disconnected from the end sections and removed laterally.

2. In a motor vehicle, the combination with the motor crank shaft and the propeller shaft, of a sectional clutch shaft intermediate the crank and propeller shafts, said clutch shaft comprising end sections and an intermediate laterally removable connecting member.

3. In a motor vehicle, the combination with the motor crank shaft and the propeller shaft, of a sectional clutch shaft intermediate the crank and propeller shafts and comprising end sections and an intermediate laterally removable connecting member, means connecting one of said end sections with the propeller shaft, and a clutch adapted to connect the other of said end sections with the crank shaft.

4. In a motor vehicle, the combination of a driving shaft, a driven shaft, an intermediate sectional clutch shaft comprising end sections and an intermediate connecting section, a casing having bearings for the driving shaft and one of said sections, a bearing in the driving shaft for the other of said end sections, and clutch members adapted for forming a driving connection between the last mentioned end section and the driving shaft.

5. In a motor vehicle, the combination of a driving shaft, a driven shaft, and an intermediate sectional clutch shaft comprising an end section connected with the driven shaft, an end section adapted to be connected with the driving shaft, and an intermediate section having telescopic engagement with the end sections.

6. In a motor vehicle, the combination of a driving shaft, a driven shaft, and an intermediate sectional clutch shaft comprising end sections, and a laterally removable intermediate section connecting the end sections and having telescopic engagement therewith.

7. In a motor vehicle, the combination of a driving shaft, a driven shaft, and an intermediate sectional clutch shaft comprising end sections provided with opposed flanges having alined holes therein with slots extending therefrom to the peripheries of the flanges, and bolts for securing said flanges together having a flattened side permitting them to be passed through said slots laterally and then turned in said holes to a position in which they are held against lateral movement.

8. In a motor vehicle, the combination of the crank shaft, a sectional clutch shaft in alinement with the crank shaft, the section of the clutch shaft most remote from the crank shaft being normally held against axial movement, and means whereby the other sections of the clutch shaft may be removed laterally without disturbing said first mentioned section.

In testimony whereof I affix my signature in presence of two witnesses.

RUSSELL HUFF.

Witnesses:
CLAIR S. COTE,
LE ROI J. WILLIAMS.